United States Patent [19]

Lavanish

[11] 3,879,191
[45] Apr. 22, 1975

[54] USE OF HERBICIDAL BENZYL ALCOHOLS

[75] Inventor: Jerome M. Lavanish, Akron, Ohio

[73] Assignee: PPG Industries, Inc., Pittsburgh, Pa.

[22] Filed: July 25, 1973

[21] Appl. No.: 382,623

Related U.S. Application Data

[63] Continuation-in-part of Ser. No. 264,685, June 20, 1972, abandoned.

[52] U.S. Cl............... 71/122; 260/592; 260/618 R
[51] Int. Cl............................................. A01n 9/24
[58] Field of Search............ 71/122, 124; 260/618 R

[56] References Cited
UNITED STATES PATENTS

| | | | |
|---|---|---|---|
| 2,806,883 | 9/1957 | Mikeska et al................ | 260/618 R |
| 2,971,986 | 2/1961 | Norton et al. ........................ | 71/122 |
| 3,021,371 | 2/1962 | Watson, Jr............................ | 71/122 |
| 3,375,096 | 3/1968 | Girard.................................. | 71/122 |
| 3,723,091 | 3/1963 | Allais et al........................... | 71/122 |

OTHER PUBLICATIONS

Mercer, "I. R. Spectra and Synthesis of some Acetophenone Ders," (1969) CA71, No. 12346N, (1969).
Zavitsas, "Syn. of 1,3-dimethyl-2-(n-butyl)benzene, etc.," (1958) CA53 p. 18891 (1959).
Kulesza et al., "Utilization of p–cyanatte in the Synthesis, etc.," (1963) CA59 p. 13854 (1963).
Reidmair, "Perfume Component," (1951) CA49, p. 2686 (1955).

*Primary Examiner*—Glennon H. Hollrah
*Attorney, Agent, or Firm*—Mark Levin

[57] ABSTRACT

Substituted benzyl alcohols are applied to the soil to preclude the establishment of weeds in the soil. These compounds are particulate effective in preventing the establishment of crabgrass.

16 Claims, No Drawings

USE OF HERBICIDAL BENZYL ALCOHOLS

CROSS-REFERENCES TO RELATED APPLICATIONS

This application is a continuation-in-part of my earlier filed application Ser. No. 264,685, filed June 20, 1972 now abandoned, and it is related in its subject matter to my earlier filed co-pending applications Ser. Nos. 264,683 now adandoned and 264,684, also filed June 20, 1972 application Ser. No. 382,630 filed even date herewith by applicant claims certain novel compounds also disclosed in this application.

BACKGROUND OF THE INVENTION

1. Field of the Invention

This invention relates to the use of chemical compounds of a particular genus as selective pre-emergent herbicides, especially for the control of grassy weeds, and in particular for the control of crabgrass.

2. Description of the Prior Art

The prior art does not teach or suggest that benzyl alcohols of the kind herein disclosed may be used as selective pre-emergent herbicides to control crabgrass.

Norton et al. U.S. Pat. No. 2,971,986 teaches the compound 4'-isopropyl 1-methyl benzyl alcohol and the use of the compound as a selective herbicide that will kill canary grass but not injure corn or tomatoes. Nothing in this patent suggests that the compound will kill crabgrass, and in fact, tests show that it does not, at rates of up to 10 pounds of active ingredient per acre. The compound of the Norton patent differs from ones of the instant invention in the fact that the compound of Norton has only one alkyl group attached to its benzene ring whereas the compounds of the claims of the instant invention have two to four alkyl group on their benzene rings.

British Pat. No. 1,039,118 teaches 1-trichloromethyl benzyl alcohols with 1 to 5 chlorine atoms on the benzene ring. It does not teach plural alkyl groups on the benzene ring, and it does not teach any activity against crabgrass.

In a 1965 abstract (63 C.A. 10589), there is a teaching that benzyl alcohol enhanced the growth of maize seedlings at low concentrations and inhibited growth at high concentrations, but this does not give any basis for suspecting any benzyl alcohols of having effectiveness as selective herbicide against crabgrass.

In a 1969 abstract (71 C.A. 12346 w) there is a teaching merely of the preparation of 2,4,6-triisopropyl-α-methylbenzyl alcohol, but no indication of any use for it.

SUMMARY OF THE INVENTION

According to the invention, crabgrass and other weeds are controlled by applying to soil in the pre-emergent mode an effective amount of a compound represented by the formula

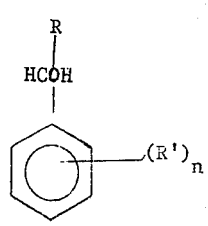

where R is hydrogen or $C_1$ to $C_4$ alkyl, each R' is independently $C_1$ to $C_6$ alkyl; and $n$ is 2, 3 or 4.

Especially good results are obtained in respect to controlling crabgrass in established bluegrass turf by using relatively modest amounts of 1-ethyl-2,4,6-triisopropyl benzyl alcohol, a novel compound.

When R is an alkyl containing from 1 to 4 carbon atoms, it may be methyl, ethyl, normal propyl, isopropyl, normal butyl, secondary butyl, isobutyl, or tertiary butyl. It is preferred that R be an alkyl containing from 1 to 3 carbon atoms. Methyl and ethyl are especially preferred.

Although each R' may contain from 1 to 6 carbon atoms, it is preferred that each R' be independently an alkyl containing from 1 to 3 carbon atoms. The isopropyl group is especially preferred. The R' groups may be the same or different. It is preferred that all R' groups be the same.

Although n may be 2, 3, or 4, values of 2 or 3 are preferred. A value of 3 is especially preferred. The various R' groups may be located on any of the five available places on the ring, but the 2',4'-positions, the 2',4',5'-positions, the 2',4',6'-positions, and the 2',3',5',6'-positions are preferred. Location in the 2',4',6'-positions is especially preferred.

The above classes and subclasses of compounds are especially effective against annual grasses, particularly small-seeded annual grasses such as crabgrass. Consequently, crabgrass or other annual grasses may be controlled by applying to the soil an amount of one or more of the benzyl alcohols effective to preclude the establishment of crabgrass or other annual grasses in the soil.

Compounds which exemplify the benzyl alcohols which may be used according to the invention are:

2',4'-dimethylbenzyl alcohol
2'-methyl-4'-ethylbenzyl alcohol
2',4'-diisopropylbenzyl alcohol
2'-ethyl-5'-amylbenzyl alcohol
2',4',5'-trimethylbenzyl alcohol
2',4',5'-triisopropylbenzyl alcohol
2'-6'-dimethyl-3'-propylbenzyl alcohol
2',4',6'-trimethylbenzyl alcohol
2',4',6'-triethylbenzyl alcohol
2',4',6'-triisopropylbenzyl alcohol
2',3',4',6'-tetramethylbenzyl alcohol
2',3',5',6'-tetramethylbenzyl alcohol
2',3',5',6'-tetraisopropylbenzyl alcohol
1,2',3'-trimethylbenzyl alcohol
1,2'-dimethyl-3'-ethylbenzyl alcohol
1,2'-dimethyl-3'-isopropylbenzyl alcohol
1,3'-dimethyl-2'-ethylbenzyl alcohol
1-methyl-2'-ethyl-3'-amylbenzyl alcohol
1-methyl-2'-ethyl-3'-(3-methylbutyl)benzyl alcohol
1,2',4'-trimethylbenzyl alcohol
1,2'-dimethyl-4'-ethylbenzyl alcohol
1-methyl-2'-ethyl-4'-propylbenzyl alcohol
1-methyl-2'-ethyl-4'-(3-methylpentyl)benzyl alcohol
1,4'-dimethyl-2'-isopropylbenzyl alcohol
1-methyl-2'-propyl-4'-ethylbenzyl alcohol
1,2',5'-trimethylbenzyl alcohol
1,2'-dimethyl-5'-propylbenzyl alcohol
1,2'-dimethyl-5'-isobutylbenzyl alcohol
1-methyl-2'-ethyl-5'-amylbenzyl alcohol
1-methyl-2'-sec-butyl-5'-isopropylbenzyl alcohol
1,2',6'-trimethylbenzyl alcohol
1,2'-dimethyl-6'-ethylbenzyl alcohol 1,2'-dimethyl-6'-isopropylbenzyl alcohol
1-methyl-2',6'-diisopropylbenzyl alcohol
1-methyl-2'-ethyl-6'-isobutylbenzyl alcohol
1-methyl-2'-ethyl-6'-(2-methylbutyl)benzyl alcohol
1,3',4'-trimethylbenzyl alcohol
1,3'-dimethyl-4'-ethylbenzyl alcohol
1,3'-dimethyl-4'-propylbenzyl alcohol
1,4'-dimethyl-3'-ethylbenzyl alcohol
1-methyl-3'-ethyl-4'-amylbenzyl alcohol
1-methyl-2'-ethyl-4'-hexylbenzyl alcohol
1,3',5'-trimethylbenzyl alcohol
1,3'-dimethyl-5'-ethylbenzyl alcohol
1,3'-dimethyl-5'-isopropylbenzyl alcohol
1,3'-dimethyl-5'-tert-butylbenzyl alcohol
1-methyl-3',5'-diisopropylbenzyl alcohol
1,2',3',4'-tetramethylbenzyl alcohol
1,2',3'-dimethyl-4'-ethylbenzyl alcohol
1,2',6'-trimethyl-4'-tert-butylbenzyl alcohol
1,4'-dimethyl-2',3'-diethylbenzyl alcohol
1,2',3',5'-tetramethylbenzyl alcohol
1,2',3'-trimethyl-5'-isopropylbenzyl alcohol
1,2'-3'-trimethyl-5'-butylbenzyl alcohol
1,2',6'-trimethyl-4'-(2,3-dimethylbutyl)benzyl alcohol
1,3'-dimethyl-2'-ethyl-5'-isobutylbenzyl alcohol
1-methyl-2',3',6'-triisopropylbenzyl alcohol
1-methyl-2'-ethyl-3',6'-diisopropylbenzyl alcohol
1,6'-dimethyl-2'-isopropyl-3'-ethylbenzyl alcohol
1,2',4',5'-tetramethylbenzyl alcohol
1-methyl-2',4',5'-triisopropylbenzyl alcohol
1,2'-dimethyl-4',5'-diethylbenzyl alcohol
1,2',4'-dimethyl-5'-ethylbenzyl alcohol
1,2',4',6'-tetramethylbenzyl alcohol
1-methyl-2',4',6'-triethylbenzyl alcohol
1-methyl-2',4',6'-triisopropylbenzyl alcohol
1-methyl-2'-ethyl-4',6'-diisopropylbenzyl alcohol
1-methyl-2'-isopropyl-4'-isobutyl-6'-ethylbenzyl alcohol
1-methyl-2',4'-dipropyl-6'-isopropylbenzyl alcohol
1,3',4',5'-tetramethylbenzyl alcohol
1,2',3',4',5'-pentamethylbenzyl alcohol
1-methyl-2',3',4',5'-tetraisopropylbenzyl alcohol
1,2',3'-trimethyl-4',5'-diethylbenzyl alcohol
1,2',4'-dimethyl-3'-ethyl-5'-isopropylbenzyl alcohol
1,2',3',4',6'-pentamethylbenzyl alcohol
1-methyl-2',3',4',6'-tetrapropylbenzyl alcohol
1-methyl-2',3',4',6'-tetraisopropylbenzyl alcohol
1-methyl-2',3',5',6'-tetraisopropylbenzyl alcohol
1-ethyl-2',3'-dimethylbenzyl alcohol
1,3'-diethyl-2'-methylbenzyl alcohol
1,2'-diethyl-3'-isopropylbenzyl alcohol
1-ethyl-2'-propyl-3'-methylbenzyl alcohol
1-ethyl-2'-methyl-3'-amylbenzyl alcohol
1-ethyl-2',4'-dimethylbenzyl alcohol
1-ethyl-2',4'-diisopropylbenzyl alcohol
1,2'-diethyl-4'-methylbenzyl alcohol
1,2'-diethyl-4'-tert-butylbenzyl alcohol
1-ethyl-2'-propyl-4'-(1-methylbutyl)benzyl alcohol
1-ethyl-2',5'-dimethylbenzyl alcohol
1,2',5'-triethylbenzyl alcohol
1-ethyl-2'-methyl-5'-isopropylbenzyl alcohol
1,2'-diethyl-5'-(2,2,-dimethylpropyl)benzyl alcohol
1-ethyl-2',6'-dimethylbenzyl alcohol
1,2',6'-triethylbenzyl alcohol
1-ethyl-2',6'-diisopropylbenzyl alcohol
1-ethyl-2',6'-dibutylbenzyl alcohol
1,6'-diethyl-2'-methylbenzyl alcohol
1-ethyl-2'-methyl-6'-propylbenzyl alcohol
1-ethyl-3',4'-dimethylbenzyl alcohol
1,4'-diethyl-3'-methylbenzyl alcohol
1,3'-diethyl-4'-methylbenzyl alcohol
1-ethyl-3',5'-dimethylbenzyl alcohol
1-ethyl-3',5'-diisopropylbenzyl alcohol
1-ethyl-3',5'-diamylbenzyl alcohol
1,3'-diethyl-5'-tert-butylbenzyl alcohol
1-ethyl-2',3',4'-trimethylbenzyl alcohol
1,4'-diethyl-2',3'-dimethylbenzyl alcohol
1-ethyl-2',3',5'-trimethylbenzyl alcohol
1-ethyl-2',3',5'-triisopropylbenzyl alcohol
1,5'-diethyl-2',3'-dimethylbenzyl alcohol
1,2'-diethyl-3',5'-dibutylbenzyl alcohol
1,2',5'-triethyl-3'-methylbenzyl alcohol
1-ethyl-2',5'-dimethyl-3'-propylbenzyl alcohol
1-ethyl-2',3',6'-trimethylbenzyl alcohol
1,2',3',6'-tetraethylbenzyl alcohol
1,2',6'-triethyl-4'-hexylbenzyl alcohol
1,2',6'-triethyl-3'-methylbenzyl alcohol
1,2',6'-diethyl-3'methylbenzyl alcohol
1-ethyl-2',4',5'-trimethylbenzyl alcohol
1,2',4',5'-tetraethylbenzyl alcohol
1-ethyl-2',4',5'-tripropylbenzyl alcohol
1-ethyl-2',4',5'-triisopropylbenzyl alcohol
1-ethyl-2',4',5'-tributylbenzyl alcohol
1-ethyl-2',4',5'-triisobutylbenzyl alcohol
1-ethyl-2',4'-dimethyl-5'-amylbenzyl alcohol
1,2'-diethyl-4',5'-dimethylbenzyl alcohol
1,4'-diethyl-2',5'-dimethylbenzyl alcohol
1-ethyl-2',5'-dimethyl-4'-propylbenzyl alcohol
1-ethyl-2',4',6'-trimethylbenzyl alcohol
1,2',4',6'-tetraethylbenzyl alcohol
1-ethyl-2',4',6'-tripropylbenzyl alcohol
1-ethyl-2',4',6'-triisopropylbenzyl alcohol
1-ethyl-2',4',6'-tributylbenzyl alcohol
1-ethyl-2',4',6'-triisobutylbenzyl alcohol
1-ethyl-2',4',6'-tri-sec-butylbenzyl alcohol
1-ethyl-2',4',6'-tri-tert-butylbenzyl alcohol
1-ethyl-2',4',6'-triamylbenzyl alcohol
1-ethyl-2',4'-dipropyl-6'-methylbenzyl alcohol
1,6'-diethyl-2',4'-diisopropylbenzyl alcohol
1,6'-diethyl-2',4'-dimethylbenzyl alcohol
1-ethyl-2',6'-dimethyl-4'-isopropylbenzyl alcohol
1-ethyl-2',6'-dimethyl-4'-sec-butylbenzyl alcohol
1,2',6'-triethyl-4'-propylbenzyl alcohol
1-ethyl-3',4',5'-trimethylbenzyl alcohol
1,3',4',5'-tetraethylbenzyl alcohol
1-ethyl-2',3',4',5'-tetramethylbenzyl alcohol
1-ethyl-2',3',4',5'-tetraisopropylbenzyl alcohol
1-ethyl-2',3',4',5 -tetrapropylbenzyl alcohol
1,3',4'-triethyl-2,5'-dimethylbenzyl alcohol
1-ethyl-2',3',4',6'-tetramethylbenzyl alcohol
1,2',3',4',6'-pentaethylbenzyl alcohol
1-ethyl-2',3',4',6'-tetrapropylbenzyl alcohol
1-ethyl-2',3',4',6'-tetraisopropylbenzyl alcohol
1-ethyl-2',3',4',6'-tetrabutylbenzyl alcohol
1-ethyl-2',3',4',6'-tetraamylbenzyl alcohol
1,3',4'-triethyl-2',6'-dimethylbenzyl alcohol
1-ethyl-2',3',4'-trimethyl-6'-isopropylbenzyl alcohol
1-ethyl-2',3',5',6'-tetramethylbenzyl alcohol
1,2',3',5',6'-pentaethylbenzyl alcohol
1-ethyl-2',3',5',6'-tetrapropylbenzyl alcohol
1-ethyl-2',3',5',6'-tetraisopropylbenzyl alcohol
1-ethyl-2',3',5',6'-tetrabutylbenzyl alcohol
1,5'-diethyl-2',3',6'-trimethylbenzyl alcohol
1-propyl-2',3'-dimethylbenzyl alcohol 1propyl-2',4'-diisopropylbenzyl alcohol
1-propyl-2'-methyl-5'-ethylbenzyl alcohol
1-propyl-2',6'-diisopropylbenzyl alcohol
1-propyl-2',4',6'-trimethylbenzyl alcohol
1-propyl-2'-ethyl-4',5'-dimethylbenzyl alcohol
1-propyl-2',4',6'-triisopropylbenzyl alcohol
1-isopropyl-2',4'-dimethylbenzyl alcohol
1,2',4'-triisopropylbenzyl alcohol
1-isopropyl-2',4'-dimethylbenzyl alcohol
1-isopropyl-3',4'-dimethylbenzyl alcohol
1-isopropyl-2',4'-diethylbenzyl alcohol
1-isopropyl-2',3',5'-trimethylbenzyl alcohol
b 1-isopropyl-2',4',6'-trimethylbenzyl alcohol
1-isopropyl-2',4',6'-triethylbenzyl alcohol
1,2',4',6'-tetraisopropylbenzyl alcohol
1-isopropyl-2',3'-dimethyl-5'-propylbenzyl alcohol
1-isopropyl-2',3',5',6'-tetramethylbenzyl alcohol
1,2',3',5',6'-pentaisopropylbenzyl alcohol
1-butyl-2',4'-dimethylbenzyl alcohol
1-butyl-2',4'-diisopropylbenzyl alcohol
1-butyl-2',4',5'-trimethylbenzyl alcohol
1-butyl-2',4',6'-trimethylbenzyl alcohol
1-butyl-2',4',6'-triisopropylbenzyl alcohol
1-butyl-2',4',5'-triisopropylbenzyl alcohol
1-butyl-2',3',5',6'-tetramethylbenzyl alcohol
1-butyl-2',3',5',6'-tetrapropylbenzyl alcohol
1butyl-2',3',5',6'-tetraisopropylbenzyl alcohol
1-sec-butyl-2',4'-dimethylbenzyl alcohol
1,3'-di-sec-butyl-5'-methylbenzyl alcohol
1-sec-butyl-2',4'-diisopropylbenzyl alcohol
1-sec-butyl-2',4',6'-triisopropylbenzyl alcohol
1-sec-butyl-2',3',5',6'-tetraisopropylbenzyl alcohol
1-isobutyl-2',4'-dimethylbenzyl alcohol
1-isobutyl-2',5'-dimethylbenzyl alcohol
1-isobutyl-2'-methyl-5'-hexylbenzyl alcohol
1-isobutyl-2',6'-dimethyl-4'-sec-butylbenzyl alcohol
1-isobutyl-2',4',6'-trimethylbenzyl alcohol
1-isobutyl-2',4',6'-triisopropylbenzyl alcohol
1-isobutyl-2',5'-dimethyl-3'-hexylbenzyl alcohol
1-isobutyl-2',3',5',6'-tetramethylbenzyl alcohol
1-isobutyl-2',3',5',6'-tetraisopropylbenzyl alcohol
1-tert-butyl-2',4'-dimethylbenzyl alcohol
1-tert-butyl-2',4'-diisopropylbenzyl alcohol
1-tert-butyl-2',4',6'-trimethylbenzyl alcohol
1-tert-butyl-2',4',6'-triisopropylbenzyl alcohol
1-tert-butyl-2',3',5',6'-tetramethylbenzyl alcohol
1-tert-butyl-2',3',5',6'-tetraethylbenzyl alcohol
1-tert-butyl-2',3',5',6'-tetraisopropylbenzyl alcohol The benzyl alcohols may be prepared by the reduction of the appropriate alkyl aryl ketones. One particularly useful reducing agent for this purpose is lithium aluminum hydride. The reaction may conveniently be conducted in a solvent.

Many of the alkyl aryl ketones used to prepare the benzyl alcohols are known to the art. In those instances where the compounds having the desired substitutions are not available, they may be prepared by any of the methods well known in chemistry. One of these is the reaction, in the presence of aluminum chloride, of a substitued benzene with an acyl chloride. Some difficulty has been encountered, however, in preparing the tert-butyl aryl ketones by this method.

The benzyl alcohols, including the 1-tert-butylbenzyl alcohols may be prepared by the reaction of the appropriate aryl Grignard reagent with the appropriate aldehyde. For example, 1-tert-butyl-2',4',6'-triisopropylbenzyl alcohol may be prepared by reacting 2,4,6-triisopropylphenyl magnesium bromide with pivaldehyde in the presence of a diethyl ether solvent.

Illustrative preparations of the benzyl alcohols are shown in Examples I-XIII:

EXAMPLE I

2',4',6'-Triisopropylpropiophenone

A 3000-milliliter, three-necked flask was fitted with a mechanical stirrer, addition funnel, and reflux condenser with drying tube. The flask was cooled in an ice bath and charged with 133.3 grams (1.00 mole) of aluminum chloride in 500 milliliters of carbon tetrachloride Then 102 grams (1.10 mole) of propionyl chloride in 500 milliliters carbon tetrachloride was added. The addition funnel was charged with 204 grams (1.00 mole) of 1,3,5-triisopropylbenzene in 300 milliliters of carbon tetrachloride. The funnel solution was added dropwise over 260 minutes at the ice bath temperature while vigorous stirring was maintained. The yellow-green slurry was stirred for an additional 120 minutes and then poured into 600 grams of ice. After the ice melted the layers were separated and the organic phase was washed with 1000 milliliters of water and then with 500 milliliters of 5 percent sodium bicarbonate solution and then dried over anhydrous magnesium sulfate. Removal of the solvent in a rotary film evaporator gave 244.3 grams of crude 2',4',6'-triisopropylpropiophenone as moist pale yellow crystals. This was used without further purification. The product may be depicted as having the structural formula:

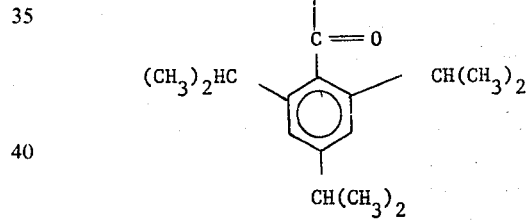

1-Ethyl-2',4',6'-triisopropylbenzyl Alcohol

A 3000-milliliter flask was outfitted as previously described. The flask was charged with 19.0 grams (0.50 mole) of lithium aluminum hydride in 1000 milliliters of dry ether. The addition funnel was charged with the 244.3 grams (0.938 mole) of the previously prepared triisopropylpropiophenone in 400 milliliters of dry ether. The addition was made dropwise at room temperature over 350 minutes. Stirring was continued overnight, after which the reaction mixture was heated to reflux for 110 minutes. After cooling there was then added dropwise 19 milliliters of water, 19 milliliters of 15% sodium hydroxide solution, and then 57 milliliters of water. Celite diatomaceous earth was then added to aid in filtering and this slurry was then suction filtered through a bed of magnesium sulfate. The filter cake was washed with two 100 milliliter portions of ether and solvent was removed from the combined filtrate in a rotary film evaporator to give 237.4 grams of crude 1-ethyl-2',4',6'-triisopropylbenzyl alcohol. The crystals were dissolved in 400 milliliters of hot hexane and then placed in a freezer to facilitate crystallization. The crystals were suction filtered and dried at 50°C. and 40 millimeters Hg. They weighed 202.4 grams and had a melting point range of 98°–102.5°C. The product may be depicted as having the structural formula:

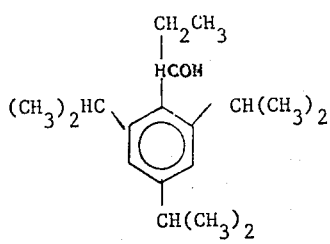

EXAMPLE II

2',4',6'-Triisopropylpropiophenone

A 3000-milliliter, four-necked flask was equipped with a mechanical stirrer, addition funnel, stopper, and reflux condenser with drying tube. The flask was charged with 147 grams (1.10 mole) of aluminum chloride and 500 milliliters of carbon tetrachloride and cooled in an ice bath. Then 102 grams (1.10 mole) of propionyl chloride in 500 milliliters of carbon tetrachloride were added. The addition funnel was charged with 204 grams (1.00 mole) of 1,3,5-triisopropylbenzene which was added with stirring over a period of about 2 hours. The mixture was stirred at ice bath temperature for 3 hours and then poured over 1000 grams of crushed ice. The flask was rinsed with 50 milliliters of carbon tetrachloride and 50 milliliters of water which were added to the ice slurry. After the ice had melted the two liquid phases were separated and the organic layer was washed with 1000 milliliters of water and 500 milliliters of 5% sodium bicarbonate solution. After drying over magnesium sulfate, the organic phase was filtered. Solvent was removed from the filtrate in a rotary film evaporator at 50°C. and 20 millimeters Hg to give 255.6 grams of pale yellow crystals having a melting point range of 81.5°–84°C. which were used without further purification. Repetition of the above procedure two more times yielded 257.3 grams of crystals having a melting point of 82°–84°C. and 256.7 grams of crystals having a melting point range of 83°–84°C.

1-Ethyl-2',4',6'-triisopropylbenzyl Alcohol

A 3000-milliliter, three-necked flask was fitted with a mechanical stirrer, addition funnel, and reflux condenser with drying tube. The flask was charged with 9.5 grams (0.25 mole) of lithium aluminum hydride in 1000 milliliters of anhydrous ether. The addition funnel was charged with 130.2 grams (0.500 mole) of triisopropylpropiophenone in 300 milliliters of dry ether which was added with stirring over a period of about 2 hours. The slurry was then heated to reflux for about 2 hours. After cooling, 9.5 milliliters of water, 9.5 milliliters of 15% sodium hydroxide solution, and 28.5 milliliters of water were added dropwise. The slurry was then suction filtered through a bed of magnesium sulfate. Solvent was removed from the filtrate in a rotary film evaporator at about 50°C. and 20 millimeters Hg to give 128.2 grams of white powder. The above procedure was repeated five more times to give the following weights of product: 126.5 grams, 127.2 grams, 127.5 grams, 125.2 grams, and 127.2 grams, respectively.

EXAMPLE III

1-Ethyl-2',4',6'-triisopropylbenzyl Alcohol

A 500-milliliter, three-necked flask was equipped with a mechanical stirrer and a continuous extractor with a reflux condenser equipped with drying tube. The flask was charged with 65.5 grams (0.25 mole) of 2',4'-,6'-triisopropylpropiophenone in 250 milliliters of dry ether. The extractor was charged with 2.9 grams of lithium aluminum hydride. The contents of the flask were refluxed with stirring over a period of about 9 hours. The extractor was then charged with an additional 2.9 grams of lithium aluminum hydride. The contents of the flask were refluxed with stirring over a period of about 12 hours. The extractor was replaced with reflux condenser and an addition funnel was affixed to the flask. After cooling by the successive addition of 6 milliliters of water, 6 milliliters of 15 percent sodium hydroxide, and 18 milliliters of water, the resulting slurry was then suction filtered through a bed of magnesium sulfate. The solvent was removed from the filtrate on a rotary film evaporator to give 57.9 grams of white solid. Recrystallization from normal hexane gave 47.4 grams of crystals having a melting point range of 99°–102°C. The product may be depicted as having the structural formula:

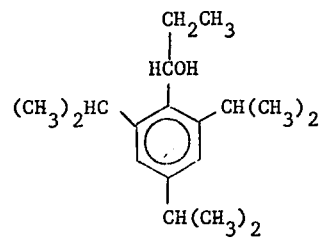

EXAMPLE IV

1-Methyl-2',4',6'-triisopropylbenzyl Alcohol

A 250-milliliter, three-necked flask was equipped with a mechanical stirrer, addition funnel, and reflux condenser with drying tube. The flask was charged with 0.7 gram (0.018 mole) of lithium aluminum hydride in 50 milliliters of dry ether. The addition funnel was charged with 14.7 grams (0.0598 mole) of 2',4',6'-triisopropylacetophenone in 50 milliliters of dry ether and this solution was added with stirring over a period of about 30 minutes. The resulting slurry was then heated to reflux for 1 hour. The excess lithium aluminum hydride was then destroyed by sequential addition of 1 milliliter of water, 1 milliliter of 15 percent sodium hydroxide and 5 milliliters of water. The resulting white slurry was then suction filtered through a bed of magnesium sulfate. The solvent was removed from the filtrate on a rotary film evaporator to give 13.4 grams of a viscous liquid which crystallized on standing. Recrystallization from normal hexane gave 10.2 grams of crystals having a melting point range of 88°–92°C. The product may be depicted as having the structural formula:

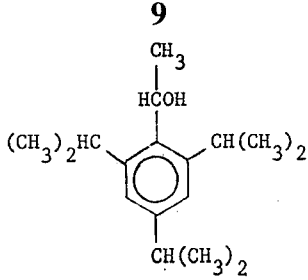

EXAMPLE V

2',4',6'-Triisopropylbutyrophenone

A 500-milliliter, three-necked flask equipped with a mechanical stirrer, addition funnel, and reflux condenser with drying tube was charged with 16.0 grams of aluminum chloride and 100 milliliters of carbon tetrachloride and cooled in an ice bath. The flask was charged with 13.9 grams of butyryl chloride and 25 milliliters of carbon tetrachloride. The funnel was charged with 20.4 grams of 1,3,5-triisopropylbenzene and 25 milliliters of carbon tetrachloride which were added with stirring over a period of about 75 minutes. The slurry was stirred for an additional 30 minutes and then poured over 250 grams of crushed ice. After melting the layers were separated and the organic phase was washed with two 200 milliliter portions of water and then with 200 milliliters of 5 percent sodium bicarbonate solution. Drying over magnesium sulfate, filtering, and removal of solvent under vaccum gave 2',4',6'-triisopropylbutyrophenone (26.0 grams) as a yellow liquid. The product may be depicted as having the structural formula:

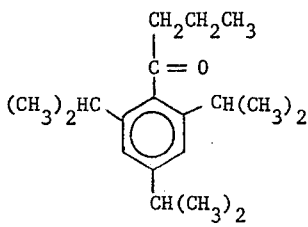

1-Propyl-2',4',6'-triisopropylbenzyl Alcohol

A 500-milliliter, three-necked flask was equipped with a mechanical stirrer, addition funnel, and reflux condenser with drying tube. The flask was charged with 1.2 gram of lithium aluminum hydride in 100 milliliters of dry ether. The addition funnel was charged with 26.0 grams of 2',4',6'-triisopropylbutyrophenone in 100 milliliters of dry ether, and this solution was added with stirring over a period of about 70 minutes. The resulting slurry was then heated to reflux for about 200 minutes. The excess lithium aluminum hydride was then destroyed by sequential addition of 1.5 milliliters of water, 1.5 milliliters of 15 percent sodium hydroxide, and 7 milliliters of water. The resulting slurry was then suction filtered through a bed of magnesium sulfate. The solvent was removed from the filtrate on a rotary film evaporator to give 19.8 grams of viscous liquid which crystallized on standing. Recrystallization twice from normal hexane gave 7.3 grams of crystals having a melting point range of 99°–102°C. The product may be depicted as having the structural formula:

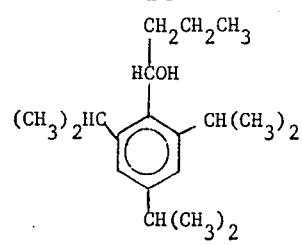

EXAMPLE VI

2',4',6'-Triisopropylisobutyrophenone

A 500-milliliter flask equipped with a mechanical stirrer, addition funnel, and reflux condenser with drying tube was charged with 16.0 grams of aluminum chloride and 100 milliliters of carbon tetrachloride and cooled in an ice bath. The flask was charged with 13.9 grams of isobutyryl chloride and 25 milliliters of carbon tetrachloride. The addition funnel was charged with 20.4 grams of 1,3,5-triisopropylbenzene which was added over a period of about 90 minutes. After stirring for 50 minutes, the slurry was poured over 250 grams of crushed ice. On melting, the layers were separated and the organic phase was washed with two 200-milliliter portions of water and then with 200 milliliters of 5 percent sodium bicarbonate solution. After drying over magnesium sulfate, filtering, and removal of the ether under vacuum, there were obtained 30.0 grams of 2',4',6'-triisopropylisobutyrophenone as a yellow liquid which solidified on cooling. The product may be depicted as having the structural formula:

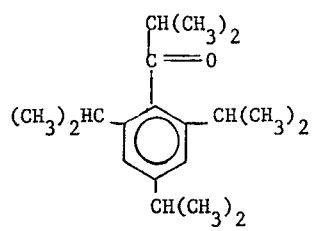

1,2',4',6'-Tetraisopropylbenzyl Alcohol

A 500-milliliter, three-necked flask was equipped with a mechanical stirrer, addition funnel, and reflux condenser with drying tube. The flask was charged with 1.7 grams of lithium aluminum hydride in 100 milliliters of dry ether. The addition funnel was charged with 24.4 grams of 2',4',6'-triisopropylisobutyrophenone in 100 milliliters of dry ether and this solution was added with stirring over a period of about 75 minutes. The resulting slurry was then heated to reflux for 2 hours. The excess lithium aluminum hydride was then destroyed by sequential addition of 2 milliliters of water, 2 milliliters of 15% sodium hydroxide, and 6 milliliters of water. The resulting slurry was then suction filtered through a bed of magnesium sulfate. The solvent was removed from the filtrate on a rotary film evaporator to give 20.7 grams of white solid. Recrystallization from normal hexane gave 16.1 grams of crystals having a melting point range of 91°–93°C. The product may be depicted as having the structural formula:

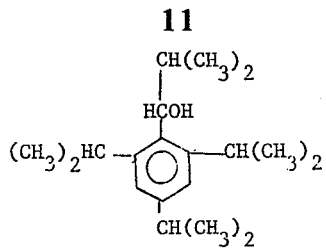

EXAMPLE VII

2',4',6'-Triisopropylbenzyl Alcohol

Into a 100-milliliter boiling flask equipped with a reflux condenser were placed 2.6 grams (0.040 mole) of 85% potassium hydroxide pellets, 50 milliliters of tert-butyl alcohol, and 5.0 grams (0.020 mole) of 2,4,6-triisopropylbenzyl chloride. After heating to reflux for about 3 hours and cooling to room temperature, 200 milliliters of water were added and the mixture was extracted with two 50-milliliter portions of chloroform. The combined extracts were dried over magnesium sulfate and filtered. Solvent was removed in a rotary film evaporator to give 4.1 grams of colorless oil which crystallized on standing. Recrystallization from normal hexane gave 2.4 grams of white crystals having a melting point range of 92°–93°C. The product may be depicted as having the structural formula:

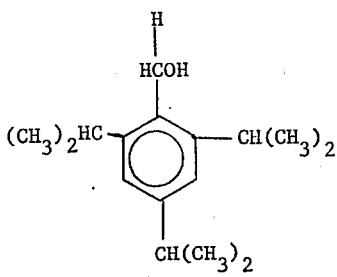

EXAMPLE VIII

2',4',6'-Triethylpropiophenone

A 500-milliliter, three-necked flask was fitted with a mechanical stirrer, addition funnel, and reflux condenser with drying tube. The flask was charged with 20.5 grams (0.154 mole) of aluminum chloride in 100 milliliters of carbon tetrachloride and then cooled in an ice bath. To this was then added 14.3 grams (0.154 mole) of propionyl chloride in 50 milliliters of carbon tetrachloride. The addition funnel was charged with 25.0 grams (0.154 mole) of 1,3,5-triethylbenzene in 25 milliliters of carbon tetrachloride. The triethylbenzene solution was added dropwise over a period of about 2 hours with stirring and the resulting red slurry was stirred in the ice bath for another period of about 2 hours. The reaction mixture was then poured into 300 grams of crushed ice. After the ice had melted, the layers were separated and the organic layer was washed with two 100-milliliter portions of water and then with 200 milliliters of 5% sodium bicarbonate solution. After drying, the carbon tetrachloride solvent was removed in a rotary film evaporator to give 31.1 grams of pale yellow liquid. The product may be depicted as having the structural formula

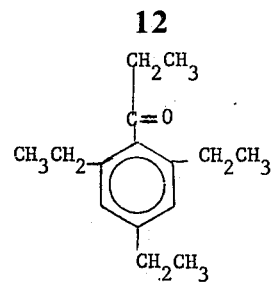

1,2',4',6'-Tetraethylbenzyl Alcohol

A 500-milliliter, three-necked flask was fitted with a mechanical stirrer, addition funnel, and reflux condenser with drying tube. The flask was charged with 2.7 grams of lithium aluminum hydride in 150 milliliters of dry ether. The funnel was charged with 31.1 grams of 2',4',6'-triethylpropiophenone and 100 milliliters of dry ether. This was added to the flask dropwise at room temperature with stirring over a period of about 2 hours. The reaction of mixture was then heated to reflux for 2 hours. After cooling, the reaction mixture was quenched by successive addition of 3 milliliters of water, 3 milliliters of 15% sodium hydroxide solution and 9 milliliters of water. Celite diatomaceous earth filter aid was then added and the slurry suction filtered through a bed of magnesium sulfate. The solvent was removed from the filtrate in a rotary film evaporator to give 27.4 grams of colorless viscous oil. The product may be depicted as having the structural formula:

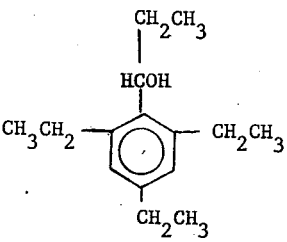

EXAMPLE IX

2',4'-Diisopropylpropiophenone

A 1000-milliliter, three-necked flask equipped with a thermometer, mechanical stirrer, and pressure equalized addition funnel with drying tube was charged with 43.9 grams of aluminum chloride and 300 milliliters of carbon tetrachloride and cooled in an ice bath. Propionyl chloride (32.4 grams) in 50 milliliters of carbon tetrachloride was then added. The addition funnel was charged with 50.2 grams of 1,3-diisopropylbenzene in 100 milliliters of carbon tetrachloride which was added over a period of about 2 hours with stirring. The slurry was then stirred at ice bath temperature for 2 hours after which it was poured over 500 grams of crushed ice. After the ice melted, the layers were separated and the organic layer was washed with 200 milliliters of water and 200 milliliters of 5% sodium bicarbonate solution and then dried over sodium sulfate. Removal of solvent under vacuum gave 2',4'-diisopropylpropiophenone (96 grams) as a clear liquid. Distillation through a 10-inch Vigreaux column at 0.25–0.4 millimeter Hg gave 53.8 grams of product boiling between 96°–100°C. The product may be depicted as having the structural formula:

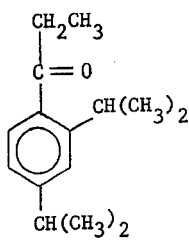

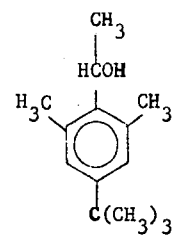

1-Ethyl-2',4'-diisopropylbenzyl Alcohol

A 500-milliliter, three-necked flask was fitted with a mechanical stirrer, addition funnel, and reflux condenser with drying tube. The flask was charged with 1.9 grams of lithium aluminum hydride in 100 milliliters of dry ether. The funnel was charged with 21.8 grams of 2',4'-diisopropylpropiophenone and 100 milliliters of dry ether. This was added dropwise at room temperature with stirring over a period of about 90 minutes. The slurry was then heated to reflux for 2 hours. After cooling, the reaction mixture was quenched by successive addition of 2 milliliters of water, 2 milliliters of 15 percent sodium hydroxide, and 6 milliliters of water. Celite diatomaceous earth filter aid was then added and this slurry was suction filtered through a bed of magnesium sulfate. Solvent was removed from the filtrate in a rotary film evaporator to give 20.5 grams of a colorless oil. The product may be depicted as having the structural formula:

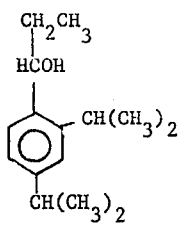

EXAMPLE X

1,2',6'-Trimethyl-4'-tert-butylbenzyl Alcohol

A 500 milliliter, three-necked flask was fitted with a mechanical stirrer and a continuous extractor with a reflux condenser equipped with a drying tube. The flask was charged with 5.10 grams of 4'-tert-butyl-2',6'-dimethylacetophenone in 250 milliliters of dry ether. The extractor was charged with 2.9 grams of lithium aluminum hydride. The contents of the flask were refluxed with stirring over a period of about 375 minutes. The extractor was replaced with a reflux condenser and an addition funnel was affixed to the flask. After cooling, the reaction was quenched by successive addition of 3 milliliters of water, 3 milliliters of 15% sodium hydroxide, and 9 milliliters of water. Magnesol filter aid was then added and this slurry was suction filtered through a bed of magnesium sulfate. Solvent was removed from the filtrate in a rotary film evaporator to give 42.3 grams of white crystals having a melting point range of 109°–112°C. The product may be depicted as having the structural formula:

EXAMPLE XI

2',4',5'-Triisopropylpropiophenone and 2',4',6'-Triisopropylpropiophenone

A 1000-milliliter, three-necked flask was equipped with a mechanical stirrer, addition funnel, and reflux condenser with drying tube. The flask was immersed in an ice bath and charged with 28.0 grams (0.21 mole) of aluminum chloride and 100 milliliters of carbon tetrachloride. Propionyl chloride in the amount of 20.4 grams (0.22 mole) in 100 milliliters of carbon tetrachloride was then added to the flask. The addition funnel was charged with 49.3 grams (0.20 mole of 1,2,4,5-tetraisopropylbenzene and 125 milliliters of carbon tetrachloride which were added with stirring over a period of about 100 minutes. The resulting brick-red slurry was stirred at ice bath temperature for 2 hours and then poured over 500 grams of crushed ice. After the ice had melted, the layers were separated. The organic phase was washed with 200 milliliters of water and 200 milliliters of 5 percent sodium bicarbonate solution and then dried over magnesium sulfate. Removal of the solvent in a rotary film evaporator gave 50.8 grams of viscous yellow oil which partially crystallized on standing. Two recrystallizations from cold normal hexane gave 22.9 grams of white crystals having a melting point range of 47°–62°C. Vapor phase chromatographic analysis (5 feet × ½ inch, SE 30 column with 20% by weight loading, 210°C., 60 milliliters of helium per minute) showed two components. The first, 2',4',6'-triisopropylpropiophenone, had a retention time of 4.8 minutes relative to the air peak and the second component, 2',4',5'-triisopropylpropiophenone, had a retention time of 6.1 minutes relative to the air peak. The peak area ratio of the first component to the second component was about 1:2.5. Several hundred milligrams of each of the above components were collected by preparative vapor phase chromatography using an 8 foot × ½ inch 10% "Carbowax 20 M" column at 220°C. The 2',4',6'-triisopropylpropiophenone sample had a melting point range of 58°–81°C. and the 2',4',5'-triisopropylpropiophenone sample had a melting point range of 51°–69°C. The 2',4',6'-triisopropylpropiophenone may be depicted as having the structure:

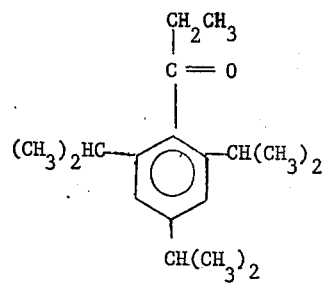

The 2',4',5'-triisopropylpropiophenone may be depicted as having the structure:

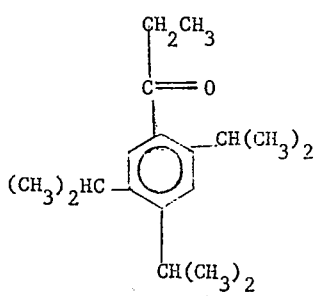

1-Ethyl-2',4',5'-triisopropylbenzyl Alcohol

A 50-milliliter, three-necked flask was equipped with a mechanical stirrer, addition funnel, and reflux condenser with drying tube. The flask was charged with 0.071 grams (0.0019 mole) of lithium aluminum hydride in 8 milliliters of dry ether. The addition funnel was charged with 0.76 grams of 2',4',5'-triisopropylpropiophenone in 8 milliliters of dry ether. This was added dropwise over a period of about 5 minutes. The slurry was then stirred at room temperature for 30 minutes and then heated to reflux for 150 minutes. After cooling, there were added sequentially with stirring 70 μl of water, 70 μl of 15% sodium hydroxide solution, and 210 μl of water. Celite diatomaceous earth filter aid was then added, and then reaction mixture was suction filtered through a bed of magnesium sulfate. Removal of solvent in a rotary film evaporator gave 0.56 of waxy white solid having a melting point range of 66°–75°C. The product may be depicted as having the structural formula:

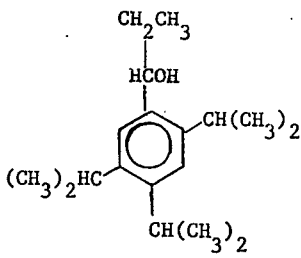

EXAMPLE XII

A 50-milliliter, three-necked flask was equipped with a mechanical stirrer, addition funnel, and a reflux condenser with drying tube. The flask was charged with 0.032 grams (0.00095 mole) or lithium aluminum hydride and 8 milliliters of dry ether. The addition funnel was charged with 0.32 gram of 2',4',6'-triisopropylpropiophenone (see Example XI) in 8 milliliters of dry ether. This was added dropwise over a period of about 5 minutes. The slurry was then stirred at room temperature for 30 minutes and then heated to reflux for 150 minutes. After cooling, there were added sequentially with stirring 40 μl of water, 40 μl of 15 percent sodium hydroxide solution, and 120 μl of water. Celite diatomaceous earth filter aid was then added, and the reaction mixture was suction filtered through a bed of magnesium sulfate. Removal of solvent in a rotary film evaporator gave 0.22 gram of waxy white solid having a melting point range of 72°–94°C. The product may be depicted as having the structural formula:

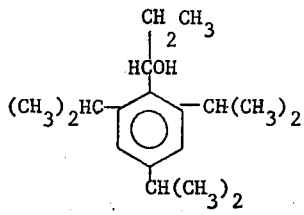

EXAMPLE XIII

1-tert-Butyl-2',4',6'-triisopropylbenzyl Alcohol

To an ethereal solution of 2,4,6-triisopropylphenyl magnesium bromide prepared by the method of R. C. Fuson and E. C. Horning, *Journal of the American Chemical Society*, 62, 2962 (1940), is added with stirring a molar equivalent of pivaldehyde. The reaction is then quenched with water and the organic layer is separated, dried over magnesium sulfate, and filtered. Removal of the ether under vacuum gives a 1-tert-butyl-2',4',6'-triisopropylbenzyl alcohol. The product may be depicted as having the structural formula:

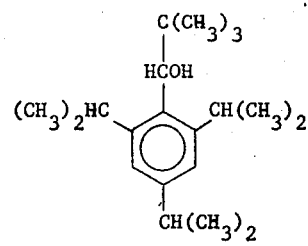

One or more benzyl alcohols may be applied to the soil in an amount effective to preclude the establishment of weeds, particularly annual grasses such as crabgrass, in the soil. The establishment precluded is with respect to mature weeds or weeds sufficiently advanced in growth to significantly interfere with the growth of desirable plants; mere germination of weed seeds to product tender seedlings which are susceptible to attack by the benzyl alcohols is not "establishment" as used herein.

The amount of the benzyl alcohol applied to the soil may vary widely. The amount usually is in the range of from 0.1 to 100 pounds per acre. Usually the amount is in the range of 0.1 to 50 pounds per acre or even in the range of from 0.5 to 20 pounds per acre. Application in the range of from 0.5 to 10 pounds per acre is preferred. While these ranges are generally applicable, it is recognized that both the optimum and useful amounts will very depending upon the crop plant involved, if any, the weeds encountered, the particular compound used, the soil condition, cultivation practices, and the effect desired. The Examples give an even better indication of the amounts of the benzyl alcohols which may advantageously be used when dealing with certain weeds.

The benzyl alcohols may be formulated in many ways. Convenient formulations include granular formulations, wettable powders, solutions, and emulsions.

These formulations may be prepared in accordance with the general techniques well known to the art. These formulations may be applied directly to the soil or they may be diluted before application.

Generally speaking, formulations contain from about 0.1 to 100 percent by weight of the benzyl alcohol. Often formulations contain from about 1 to about 50 percent by weight of the benzyl alcohol. Of course, the precise amount will depend upon such factors as the type of formulation employed, the type of application, and the mode of application.

Suitable wettable powders typically contain from about 1 to about 100 percent by weight of the benzyl alcohol. Ordinarily wettable powders contain from 10 to 85 percent by weight of the benzyl alcohol. The benzyl alcohol may be admixed with an inert powder such as silica, chalk, talc, limestone, or clay. Any convenient amount of diluent may be used, from about 15 to about 90 percent being typical. Small amounts of dispersing and/or wetting agents are usually included in the formulations. These usually range from 0.1 to 15 percent by weight of the formulation. Ordinarily amounts ranging from 1 to 12 percent are used. The wettable powder is typically dispersed in water for application.

Solutions of the benzyl alcohol may be prepared. Ordinarily concentrated solutions are prepared which, when diluted with water for application, form emulsions. Solvents suitable for use are numerous and include many well known for their solvency powers. Examples include the xylenes, toluene, methyl alcohol, ethyl alcohol, isopropyl alcohol, the butyl alcohols, water, gasoline, kerosene, diethyl ether, methyl ethyl ether, ethylene glycol, propylene glycol, n-amyl acetate, allyl alcohol, Cello-Solve, methyl acetate, ethyl acetate, acetone, methyl ethyl ketone, methyl isobutyl ketone, benzene, methyl naphthalene, ethyl naphthalene, and edible oils such as corn oil, olive oil, cod liver oil, cottonseed oil, safflower oil, soybean oil, and peanut oil.

The formulations of the present invention frequently include small amounts of various surfactants such as wetting agents, emulsifiers, and dispersants. Anionic surfactants are used for wettable powders. Emulsifiable concentrates generally contain blends of ionic and anionic surfactants. Many surfactants are available as commercial products. Well known dispersing agents which are useful in wettable powders include the lignin surfactants (ligno sulfonates) such as those described in U.S. Pat. No. 2,491,832, and the alkaryl sulfonates. The ligno sulfonates of most interest are the metallic, notably the sodium and calcium, sulfonate salts. Molecular weights of these materials normally range from about 1,000 to about 20,000. Another useful class of surfactants comprises the formaldehyde-naphthalene sulfonate condensates typified by those disclosed in U.S. Pat. No. 2,516,095. Other useful dispersing agents are found among the alkali metal derivatives of unsaturated and aromatic hydrocarbons, the alkali metal alcoholates of long chain alcohols, and the anhydrous alkali metal soaps of higher fatty acids. Particularly suitable wetting agents for wettable powders are the taurates typified by sodium N-methyl-N-oleoyl taurate. Sodium alkyl naphthalene sulfonates and the oleic acid ester of sodium isothionate are also especially useful. The condensation products of alkylene oxides with phenols and organic acids, the polyalkylene derivatives of sorbitan esters, complex ether alcohols, and mahogany soaps are examples of useful ionic surfactants. Other surface-active agents of the same or similar physical properties are known to the art and can be employed in the formulations of this invention.

It is often desirable to include in a formulation which is to be mixed with water a small amount e.g., about 1/10 to about 1 percent by weight of a suitable anti-foaming agent. Useful anti-foaming agents include the ditertiary acetylenic glycols, such as those marketed under the tradename "SURFYNOL" by Air Reduction Chemical and Carbide Company, 150 E. 42nd Street, New York, N.Y. 10017. Other compounds known to the art to function as anti-foaming agents may be employed if desired. Such compounds include 2-octonol, sulfonated oils, and silicones. Useful silicones are those of low molecular weight, i.e., the silicone fluids or oils. Typical of these are the methyl and ethyl substituted siloxanes such as the dimethyl siloxanes.

Many of the solvents, solvent systems, and wetting agents are discussed in U.S. Pat. Nos. 2,695,225 and 3,330,642 and Canadian Patent No. 851,658.

The amount of the benzyl alcohol in liquid formulations, including both single-phase solutions and emulsions, is subject to wide variation. The liquid may contain the benzyl alcohol in very dilute concentrations although it is ordinarily not so dilute that excessive amounts of solvent must be applied in order to achieve application of a useful amount of the benzyl alcohol. The lowest practical concentration for most purposes is the concentration at which the formulation is applied to the soil. The upper limit of concentration is the solubility limit of the benzyl alcohol in the solvent or solvent system used. This will, of course, depend upon the identity of the benzyl alcohol, the identity of the solvent system, and the highest temperature for which precipitation of solids is acceptable. It is ordinarily desirable to form a concentrated liquid formulation, usually an emulsifiable concentrate or concentrated emulsion, of the benzyl alcohol which will not show precipitation above about 20°F. and, more preferably, above about 10°F. A broad range of concentration for the benzyl alcohol in a liquid formulation is from 0.05 percent to 90 percent by weight. Liquid concentrates generally contain from about 10 percent to about 70 percent by weight of the benzyl alcohol. From about 35 percent to about 55 percent is preferred. Liquid formulations generally contain from about 0.05 percent to about 70 percent of the benzyl alcohol at the time of application. Typically, the range is from 0.1 to 10. From about 0.5 percent to 5 percent is preferred.

Granular formulations may be prepared by spraying the molten benzyl alcohol directly onto an inert carrier. In another method, a liquid formulation, either a solution or an emulsion, may be applied to the inert carrier particles. Many types of inert carrier particles are suitable for use in the instant invention. Among these are montmorillonite, bentonite, vermiculite, corn cobs, and sawdust. The benzyl alcohol ordinarily constitutes from about 0.5 to about 50 percent by weight of these granular products. Typically, the benzyl alcohol content ranges from about 1 to about 35 percent by weight. From about 10 to about 30 percent is preferred.

In the following examples, test plants are abbreviated according to the following key:

Crops
SUBT  Sugar Beet (*Beta vulgaris*, L.)
CORN  Corn (*Zea mays*, L.)
OATS  Oats (*Avena sativa*, L.)
CLVR  Red Clover (*Trifolium pratense*, L.)
SOYB  Soybean (*Glycine max* [L.] Merr.)
COTN  Cotton (*Gossypium hirsutum*, L.)
WHT   Wheat (*Triticum aestivum*, L.)
PNUT  Peanut (*Arachis hypogaea*, L.)
RICE  Rice (*Oryza sativa*, L.)
KYBG  Kentucky Bluegrass (*Poa pratensis*, L.)
ALFA  Alfalfa (*Medicago sativa*, L.)
FLAX  Flax (*Linum ulsitatissimum*, L.)

Weeds
YNSG  Yellow Nutsedge (*Cyperus esculentus*, L.)
WOAT  Wild Oats (*Avena fatua*, L.)
JMWD  Jimsonweed (*Datura stramonium*, L.)
VTLF  Velvetleaf (*Abutilon theophrasti*, Medic.)
JNGS  Johnsongrass (*Sorghum halepense*, Pers.)
PIGW  Pigweed (*Amaranthus retroflexus*, L.)
MSTD  Mustard (*Brassica kaber*, L. C. Wheeler, Var. *pinnatifida*, L. C. Wheeler)
YLFX  Yellow Foxtail (*Setaria glauca* [L.] Beauv.)
BNGS  Barnyard grass (*Echinochloa crusgalli*, Beauv.)
CBGS  Crabgrass (*Digitaria sanguinalis* [L.] Scop.)
BKWT  Buckwheat (*Polygonum convolvulus*, L.)
MNGY  Morning Glory (Mixture of *Ipomoea purpurea*, Roth and *Ipomoea hederacea*, Jacq.)
QKGS  Quackgrass (*Agropyron repens* [L.] Beauv.)
GTFX  Giant Foxtail (*Setaria faberii*, Herrm.)
CKBR  Cocklebur (*Xanthium pennsylvanicum*, Wallr.)
CTGS  Cheatgrass (*Bromus tectorum*, L.)
GNFX  Green Foxtail (*Setaria viridis* [L.] Beauv.)
PNSG  Purple Nutsedge (*Cyperus rotundus*, L.)
FPAN  Fall Panicum (*Panicum dichlotomiflorum*, Michx.)
CTHS  Canada Thistle (*Cirsium arvense* [L.] Scop.)
LMQR  Lambsquarter (*Chenopodium album*, L.)
SWGS  Switchgrass (*Panicum virgatum*, L.)
ARYE  Annual Ryegrass (*Lolium multiflorum*, Lam.)
All plants are grown from seeds unless otherwise indicated:
(R) = grown from rhizomes
(T) = grown from tubers

EXAMPLE XIV

Test compound is formulated in a solvent mixture (90% acetone, 8% methanol, and 2% dimethylformamide by volume) to form a solution. Appropriate weed species are seeded in individual disposable, three-inch square containers containing about 2 inches of soil. A small amount of sand, usually one-eighth to one-fourth inch in depth, is applied to cover the seeds. The containers are placed on carrying trays and the carrying trays of containers are then placed on a conveyor belt having a linear speed of 1.3 miles per hour. As each tray is moved along on the conveyor belt, it trips a microswitch which, in turn, activates a solenoid valve and releases the solution of the test as sprays at the rate of 50 gallons per acre. The test compounds are immediately watered in and the containers then removed to the greenhouse and held for observation. Treatments are observed daily for interim response, final observations being made at the conclusion of the holding period. Any treatments inducing especially significant responses are held beyond the regular holding period until such responses can be confirmed. Each result is reported as an Injury Rating which is represented as follows: 0—no visible effect; 1, 2, or 3—slight injury, a plant usually recovered with little or no reduction in top growth; 4, 5, or 6—moderate injury, plants usually recovered but with reduced top growth; 7, 8, or 9—severe injury, plants usually did not recover; 10—complete control.

Using this procedure, 1'2',6-trimethyl-4'-tert-butylbenzyl alcohol was evaluated. The identities of the test plants, holding periods, rate of application, and results are shown in Table I.

Table 1

Injury Ratings of Test Plants After Treatment With
1,2',6'-Trimethyl-4'-tert-butylbenzyl Alcohol
at 10 Pounds Per Acre

| Test Plants | Holding Period, Days After Application | |
|---|---|---|
| | 13 | 20 |
| YNSG (T) | 0 | 0 |
| WOAT | 0 | 0 |
| JMWD | 0 | 0 |
| VTLF | 0 | 2 |
| JNGS | 0 | 2 |
| PIGW | 5 | 5 |
| MSTD | 5 | 2 |
| YLFX | 0 | 0 |
| BNGS | 3 | 2 |
| CBGS | 9 | 8 |
| BKWT | 2 | 2 |
| MNGY | 2 | 0 |

EXAMPLE XV

The procedure of Example XIV is repeated using 1-ethyl-2', 4', 6'-triisopropylbenzyl alcohol as the test compound. The identities of the test plants, holding periods, rate of application and results are shown in Table 2.

Table 2

Injury Ratings of Test Plants After Treatment With
1-Ethyl-2',4',6'-triisopropylbenzyl Alcohol
at 10 Pounds Per Acre

| Test Plants | Holding Period, Days After Application | |
|---|---|---|
| | 13 | 20 |
| YNSG (T) | 0 | 0 |
| WOAT | 0 | 0 |
| JMWD | 3 | 4 |
| VTLF | 3 | 3 |
| JNGS | 7 | 6 |
| PIGW | 4 | 4 |
| MSTD | 5 | 8 |
| YLFX | 8 | 9 |
| BNGS | 8 | 9 |
| CBGS | 9 | 10 |
| BKWT | 2 | 4 |
| MNGY | 0 | 0 |

EXAMPLE XVI

The procedure of Example XIV is repeated using 1-ethyl-2', 4', 6'-triisopropylbenzyl alcohol as the test compound applied at lower rates. The identities of the test plants, holding periods, rates of application, and results are shown in Table 3.

Table 3

Injury Ratings of Test Plants After Treatment With
1-Ethyl-2',4',6'-triisopropylbenzyl Alcohol

| Test Plants | Holding Period, Days after Application | | | | | |
|---|---|---|---|---|---|---|
| | 13 | | | 20 | | |
| Rate, pounds per acre | 5 | 2 | 1 | 5 | 2 | 1 |
| YNSG (T) | 6 | 2 | 2 | 5 | 2 | 0 |
| WOAT | 2 | 2 | 0 | 2 | 0 | 0 |
| JMWD | 5 | 4 | 2 | 4 | 2 | 0 |
| VTLF | 2 | 0 | 0 | 2 | 0 | 0 |
| JNGS | 8 | 8 | 8 | 9 | 8 | 8 |
| PIGW | 5 | 2 | 1 | 4 | 0 | 0 |
| MSTD | 5 | 5 | 3 | 5 | 3 | 2 |
| YLFX | 8 | 8 | 8 | 9 | 8 | 8 |
| BNGS | 8 | 8 | 5 | 9 | 8 | 5 |

Table 3-Continued

Injury Ratings of Test Plants After Treatment With
1-Ethyl-2',4',6'-triisopropylbenzyl Alcohol

| Test Plants | Holding Period, Days after Application | | | | | |
|---|---|---|---|---|---|---|
| | 13 | | | 20 | | |
| CBGS | 10 | 10 | 9 | 10 | 10 | 9 |
| BKWT | 0 | 0 | 0 | 0 | 0 | 0 |
| MNGY | 0 | 0 | 0 | 0 | 0 | 0 |

EXAMPLE XVII

The procedure of Example XIV is repeated using 1-ethyl-2', 4', 6'-triisopropylbenzyl alcohol as the test compound applied at lower rates to both crop plants and weed plants. The identities of the test plants, holding periods, rates of application, and results are shown in Table 4.

Table 4

Injury Ratings of Test Plants After Treatment With
1-Ethyl-2',4',6'-Triisopropylbenzyl Alcohol

| Test Plants | Holding Period, Days After Application | | | | | |
|---|---|---|---|---|---|---|
| | 13 | | | 27 | | |
| Rate, pounds per acre | 5 | 2 | 1 | 5 | 2 | 1 |
| Crops | | | | | | |
| SUBT | 0 | 0 | 0 | 0 | 0 | 0 |
| CORN | 0 | 0 | 0 | 0 | 0 | 0 |
| OATS | 0 | 0 | 0 | 0 | 0 | 0 |
| CLVR | 4 | 3 | 0 | 3 | 0 | 0 |
| SOYB | 0 | 0 | 0 | 0 | 0 | 0 |
| COTN | 0 | 0 | 0 | 0 | 0 | 0 |
| WHT | 5 | 5 | 4 | 3 | 2 | 0 |
| PNUT | 0 | 0 | 0 | 0 | 0 | 0 |
| RICE | 0 | 0 | 0 | 0 | 0 | 0 |
| KYBG | 10 | 10 | 10 | 10 | 9 | 6 |
| ALFA | 5 | 1 | 0 | 0 | 0 | 0 |
| FLAX | 1 | 0 | 0 | 0 | 0 | 0 |
| Weeds | | | | | | |
| QKGS (R) | 0 | 0 | 0 | 0 | 0 | 0 |
| JNGS (R) | 4 | 0 | 0 | 0 | 0 | 0 |
| JNGS | 8 | 8 | 6 | 8 | 7 | 3 |
| GTFX | 8 | 8 | 8 | 9 | 9 | 7 |
| CKBR | 10 | 10 | 0 | 10 | 10 | 0 |
| CTGS | 2 | 0 | 0 | 0 | 0 | 0 |
| GNFX | 9 | 8 | 8 | 9 | 5 | 5 |
| PNSG (T) | 1 | 0 | 0 | 0 | 0 | 0 |
| FPAN | 9 | 8 | 8 | 7 | 7 | 6 |
| CTHS (R) | 0 | 0 | 0 | 0 | 0 | 0 |
| PIGW | 4 | 4 | 6 | 0 | 0 | 0 |

EXAMPLE XVIII

The procedure of Example XIV is repeated using 1-methyl-2', 4', 6'-triisopropylbenzyl alcohol as the test compound. The identities of the test plants, holding periods, rate of application, and results are shown in Table 5.

Table 5

Injury Ratings of Test Plants After Treatment With
1-Methyl-2',4',6'-triisopropylbenzyl Alcohol
at 10 Pounds Per Acre

| Test Plants | Holding Period, Days After Application | |
|---|---|---|
| | 14 | 23 |
| YNSG (T) | 0 | 0 |
| WOAT | 0 | 0 |
| JMWD | 2 | 2 |
| VTLF | 3 | 4 |

Table 5-Continued

Injury Ratings of Test Plants After Treatment With
1-Methyl-2',4',6'-triisopropylbenzyl Alcohol
at 10 Pounds Per Acre

| Test Plants | Holding Period, Days After Application | |
|---|---|---|
| | 14 | 23 |
| JNGS | 3 | 3 |
| PIGW | 5 | 9 |
| MSTD | 7 | 8 |
| YLFX | 9 | 7 |
| BNGS | 6 | 6 |
| CBGS | 10 | 10 |
| BKWT | 3 | 3 |
| MNGY | 0 | 0 |

EXAMPLE XIX

The procedure of Example XIV is repeated using 1, 2', 4', 6'-tetraisopropylbenzyl alcohol as the test compound. The identities of the test plant, holding periods, rate of application, and results are shown in Table 6.

Table 6

Injury Ratings of Test Plants After Treatment With
1,2',4',6'-Tetraisopropylbenzyl Alcohol
at 10 Pounds Per Acre

| Test Plants | Holding Period, Days After Application | |
|---|---|---|
| | 14 | 23 |
| YNSG (T) | 0 | 0 |
| WOAT | 3 | 2 |
| JMWD | 2 | 2 |
| VTLF | 0 | 0 |
| JNGS | 0 | 0 |
| PIGW | 1 | 2 |
| MSTD | 8 | 8 |
| YLFX | 9 | 9 |
| BNGS | 8 | 7 |
| CBGS | 9 | 10 |
| BKWT | 0 | 0 |
| MNGY | 0 | 0 |

EXAMPLE XX

The procedure of Example XIV is repeated using 1-propyl-2', 4', 6'-triisopropylbenzyl alcohol as the test compound. The identities of the test plants, holding periods, rate of application, and results are shown in Table 7.

Table 7

Injury Ratings of Test Plants After Treatment With
1-Propyl-2',4',6'-triisopropylbenzyl Alcohol
at 10 Pounds Per Acre

| Test Plants | Holding Period, Days After Application | |
|---|---|---|
| | 14 | 23 |
| YNSG (T) | 0 | 0 |
| WOAT | 0 | 0 |
| JMWD | 3 | 0 |
| VTLF | 4 | 0 |
| JNGS | 0 | 2 |
| PIGW | 2 | 2 |
| MSTD | 7 | 9 |
| YLFX | 9 | 9 |
| BNGS | 7 | 4 |
| CBGS | 9 | 9 |
| BKWT | 0 | 0 |
| MNGY | 0 | 0 |

EXAMPLE XXI

The procedure of Example XIV is repeated using 1-ethyl-2', 4'-diisopropylbenzyl alcohol as the test compound. The identities of the test plants, holding period, rate of application, and results are shown in Table 8.

Table 8

Injury Ratings of Test Plants 14 Days After Treatment
With 1-Ethyl-2',4'-diisopropylbenzyl Alcohol
at 10 Pounds Per Acre

| Test Plants | Injury Rating |
|---|---|
| YNSG (T) | 0 |
| WOAT | 0 |
| JMWD | 0 |
| VTLF | 0 |
| JNGS | 0 |
| PIGW | 0 |
| MSTD | 0 |
| YLFX | 0 |
| BNGS | 0 |
| CBGS | 0 |
| BKWT | 0 |
| MNGY | 0 |

EXAMPLE XXII

The procedure of Example XIV is repeated using 1, 2'4', 6'-tetraethylbenzyl alcohol was the test compound. The identities of the test plants, holding period, rate of application, and results are shown in Table 9.

Table 9

Injury Ratings of Test Plants 14 Days After Treatment
With 1,2',4',6'-Tetraethylbenzyl Alcohol
at 10 Pounds Per Acre

| Test Plants | Injury Rating |
|---|---|
| YNSG (T) | 0 |
| WOAT | 0 |
| JMWD | 0 |
| VTLF | 0 |
| JNGS | 0 |
| PIGW | 1 |
| MSTD | 0 |
| YLFX | 4 |
| BNGS | 4 |
| CBGS | 7 |
| BKWT | 0 |
| MNGY | 0 |

EXAMPLE XXIII

The procedure of Example XIV is repeated using 1-methyl-2', 4', 6'-triisopropylbenzyl alcohol as the test compound applied at lower rates. The identities of the test plants, holding period, rates of application, and results are shown in Table 10.

Table 10

Injury Ratings of Test Plants 13 Days After Treatment
With 1-Methyl-2',4',6'-triisopropylbenzyl Alcohol

| Test Plants | Rate, Pounds Per Acre | | |
|---|---|---|---|
|  | 5 | 2 | 1 |
| YNSG (T) | 0 | 0 | 0 |
| WOAT | 0 | 0 | 0 |
| JMWD | 0 | 0 | 0 |
| VTLF | 0 | 0 | 0 |
| JNGS | 4 | 0 | 0 |
| PIGW | 5 | 0 | 0 |
| MSTD | 3 | 0 | 0 |
| YLFX | 7 | 3 | 3 |
| BNGS | 7 | 5 | 2 |
| CBGS | 9 | 3 | 3 |
| BKWT | 0 | 0 | 0 |
| MNGY | 0 | 0 | 0 |

EXAMPLE XXIV

The procedure of Example XIV is repeated using 1,2'4', 6'-tetraisopropylbenzyl alcohol as the test compound applied at lower rates. The identities of the test plants, holding period, rates of application, results are shown in Table 11.

Table 11

Injury Ratings of Test Plants 13 Days After Treatment
With 1,2',4',6'-Tetraisopropylbenzyl Alcohol

| Test Plants | Rate, Pounds Per Acre | | |
|---|---|---|---|
|  | 5 | 2 | 1 |
| YNSG (T) | 0 | 0 | 0 |
| WOAT | 0 | 0 | 0 |
| JMWD | 0 | 0 | 0 |
| VTLF | 0 | 0 | 0 |
| JNGS | 0 | 0 | 0 |
| PIGW | 0 | 0 | 0 |
| MSTD | 4 | 0 | 0 |
| YLFX | 6 | 4 | 1 |
| BNGS | 3 | 1 | 0 |
| CBGR | 9 | 7 | 2 |
| BKWT | 0 | 0 | 0 |
| MNGY | 0 | 0 | 0 |

EXAMPLE XXV

The procedure of Example XIV is repeated using 1-propyl-2', 4', 6'-triisopropylbenzyl alcohol as the test compound applied at lower rates. The identities of the test plants, holding periods, rates of application, and results are shown in Table 12.

Table 12

Injury Ratings of Test Plants After Treatment With
1-Propyl-2',4',6'-triisopropylbenzyl Alcohol

| Test Plants | Holding Period, Days After Application | | | | | |
|---|---|---|---|---|---|---|
|  | 13 | | | 20 | | |
| Rate, pounds per acre | 5 | 2 | 1 | 5 | 2 | 1 |
| Crops |  |  |  |  |  |  |
| YNSG (T) | 0 | 0 | 0 | 0 | 0 | 0 |
| WOAT | 0 | 0 | 0 | 0 | 0 | 0 |
| JMWD | 2 | 2 | 0 | 0 | 0 | 0 |
| VTLF | 3 | 2 | 1 | 0 | 0 | 0 |
| JNGS | 1 | 0 | 0 | 0 | 0 | 0 |
| PIGW | 2 | 2 | 2 | 0 | 0 | 0 |
| MSTD | 4 | 2 | 0 | 4 | 0 | 0 |
| YLFX | 9 | 8 | 4 | 9 | 5 | 0 |
| BNGS | 8 | 8 | 0 | 5 | 2 | 0 |
| CBGS | 9 | 9 | 5 | 9 | 8 | 5 |
| BKWT | 1 | 0 | 0 | 0 | 0 | 0 |
| MNGY | 1 | 0 | 0 | 0 | 0 | 0 |

EXAMPLE XXVI

The procedure of Example XIV is repeated using 2',4',6'-triisopropylbenzyl alcohol on the test compound. The identities of the test plants, holding periods, rate of application, and results are shown in Table 13.

Table 13

Injury Ratings of Test Plants After Treatment With
2',4',6'-Triisopropylbenzyl Alcohol at
10 pounds per acre

| Test Plants | Holding Period, Days After Application | |
|---|---|---|
| | 20 | 27 |
| YNSG (T) | 0 | 0 |
| WOAT | 0 | 0 |
| JMWD | 0 | 2 |
| VTLF | 3 | 0 |
| JNGS | 5 | 0 |
| LMQR | 3 | 0 |
| MSTD | 0 | 0 |
| YLFX | 6 | 6 |
| BNGS | 3 | 1 |
| CBGS | 10 | 10 |
| BKWT | 0 | 0 |
| MNGY | 0 | 0 |

EXAMPLE XXVII

The procedure of Example XIV is repeated using a mixture of 1-ethyl-2',4',6'-triisopropylbenzyl alcohol and 1-ethyl-2',4',5'-triisopropylbenzyl alcohol in a 3:2 molar ratio as the test composition. The identities of the test plants, holding periods, rate of application, and results are shown in Table 14.

EXAMPLE XXVIII

A soil mixture (2 parts sandy loam, 1 part sand) was placed into pots. Pots were then seeded with switchgrass, cheatgrass, yellow foxtail, wild oats, crabgrass, and annual ryegrass. Immediately after planting, the soil surfaces were sprayed with the test compound 1-ethyl-2', 4', 6'-triisopropylbenzyl alcohol dissolved in 20 milliliter of a solvent mixture (90% acetone, 8% methanol, and 2% dimethylformamide by volume). The sprayed pots were placed under light banks and rated 2 weeks after application of the test compound. The plant injury ratings were expressed on a scale ranging from 0 (no effect) to 10 (complete kill). All treatments were applied in duplicate. The rates of application and the results are shown in Table 15.

EXAMPLE XXIX

The procedure of Example XXVIII is repeated except that 1-ethyl-2', 4', 5'-triisopropylbenzyl alcohol is used as the test compound. The rates of application and the results are shown in Table 15.

EXAMPLE XXX

The procedure of Example XXVIII is repeated except that 1-ethyl-2', 4', 6'-triisopropylbenzyl alcohol prepared from a different source is used as the test compound. The rates of application and the results are shown in Table 15.

Table 15

Injury Ratings of Test Plants Two Weeks After
Treatment With Various Benzyl Alcohols

| Test Compound | 1 pound per acre | | | | | | 2 pounds per acre | | | | | | 5 pounds per acre | | | | | |
|---|---|---|---|---|---|---|---|---|---|---|---|---|---|---|---|---|---|---|
| | *1. | *2. | *3. | *4. | *5. | *6. | *1. | *2. | *3. | *4. | *5. | *6. | *1. | *2. | *3. | *4. | *5. | *6. |
| Control | 0 | 0 | 0 | 0 | 0 | 0 | 0 | 0 | 0 | 0 | 0 | 0 | 0 | 0 | 0 | 0 | 0 | 0 |
| 1-Ethyl-2',4',5'-triisopropylbenzyl Alcohol | 3 | 2 | 2 | 0 | 9 | 5 | 8 | 3 | 8 | 4 | 10 | 6 | 10 | 9 | 9 | 8 | 10 | 8 |
| | 2 | 2 | 0 | 0 | 9 | 6 | 5 | 4 | 8 | 6 | 10 | 4 | 10 | 10 | 9 | 7 | 10 | 7 |
| 1-Ethyl-2',4',6'-triisopropylbenzyl Alcohol | 5 | 5 | 2 | 0 | 6 | 6 | 10 | 5 | 8 | 2 | 9 | 8 | 9 | 8 | 9 | 7 | 10 | 10 |
| | 5 | 3 | 0 | 0 | 9 | 8 | 7 | 9 | 8 | 4 | 10 | 7 | 10 | 9 | 9 | 7 | 10 | 10 |
| 1-Ethyl-2',4',6'-triisopropylbenzyl Alcohol | 7 | 5 | 3 | 0 | 9 | 5 | 9 | 7 | 7 | 0 | 10 | 9 | 10 | 7 | 9 | 6 | 10 | 10 |
| | 7 | 5 | 2 | 2 | 9 | 6 | 10 | 7 | 8 | 2 | 10 | 9 | 10 | 8 | 9 | 4 | 10 | 10 |

*1. SWGS
*2. CTGS
*3. YLFX
*4. WOAT
*5. CBGS
*6. ARYE

Table 14

Injury Ratings of Test Plants After Treatment With
A Mixture of 1-Ethyl-2',4',6'-triisopropylbenzyl
Alcohol and 1-Ethyl-2',4',5'-triisopropylbenzyl Alcohol
In a 3:2 Molar Ratio at 10 Pounds Per Acre

| Test Plants | Holding Period, Days After Application | |
|---|---|---|
| | 20 | 27 |
| YNSG (T) | 0 | 0 |
| WOAT | 0 | 0 |
| JMWD | 7 | 8 |
| VTLF | 3 | 0 |
| JNGS | 9 | 9 |
| LMQR | 5 | 3 |
| MSTD | 8 | 9 |
| YLFX | 9 | 9 |
| BNGS | 9 | 9 |
| CBGS | 10 | 10 |
| BKWT | 1 | 0 |
| MNGY | 0 | 0 |

EXAMPLE XXXI

Several 3-inch paper pots were filled with a soil mixture (2 parts clay loam, 1 part sand). Pots were then seeded with crabgrass, johnsongrass, barnyardgrass, and yellow foxtail. Immediately after seeding, the soil surfaces were sprayed with the test compound 1-ethyl-2', 4'-diisopropylbenzyl alcohol in 5 milliliters of a solvent mixture (90 percent acetone, 8 percent methanol, and 2 percent dimethylformamide by volume). Each pot received 0.5 milligrams of test compound for each pound per acre applied. The sprayed pots were watered soon after spraying. Plants were grown under light banks with a 12-hour photoperiod at a temperature of 73°±2°F. The plants were rated 2 weeks after application of the test compound. The plant injury ratings were expressed on a scale ranging from 0 (no effect) to 10 (complete kill). The rate of application and results are shown in Table 16.

Table 16

Injury Ratings of Test Plants 2 Weeks After Treatment
With 1-Ethyl-2',4'-diisopropylbenzyl Alcohol
at 50 Pounds Per Acre

| Test Plants | Injury Rating |
|---|---|
| CBGS | 9 |
| JNGS | 9 |
| BNGS | 8 |
| YLFX | 4 |

EXAMPLE XXXII

In the late spring, purchased merion bluegrass (*Poa pratensis*, L. var. Merion) sod was laid down to form 10 ft. by 3 ft. plots. The sod was allowed to become established and 14 days after the sod was laid the plots were seeded with crabgrass (*Digitaria sanguinalis* [L.] Scop.) The seeds were then raked in the grass and the plots sprayed with solutions of 1-ethyl-2', 4', 6'-triisopropylbenzyl alcohol. The sprayer covered a 4-foot wide strip; therefore, the amount of compound sprayed on the plots was calculated based on 40-square-feet plots. Treatments applied to the seeded plots on the day of seeding were:
1. Control not seeded with crabgrass.
2. Control seeded with crabgrass.
3. 1-Ethyl-2', 4', 6'-triisopropylbenzyl Alcohol at 5 pounds per acre.
4. 1-Ethyl-2', 4', 6'-triisopropylbenzyl Alcohol at 2 pounds per acre.
5. 1-Ethyl-2', 4', 6'-triisopropylbenzyl Alcohol at 1 pound per acre.

The plots were examined for emergence of crabgrass 3 weeks after spraying. None of the plots, treated or untreated, contained any crabgrass. The sod was not treated by the sod grower with any crabgrass herbicide and the sown crabgrass was viable; therefore, only the good quality, condition, and density of the sod prevented the growth of crabgrass in the untreated plots.

Fifty-eight days after laying the sod, the sod plots were distressed and severely damaged by using a rotary tiller to decrease turf density. All the previously treated and some untreated plots were then reseeded with crabgrass and two previously untreated plots were treated with solutions of 1-ethyl-2', 4', 6'-triisopropylbenzyl alcohol at 2 pounds per acre and 5 pounds per acre, respectively.

Three weeks after reseeding of the thinned sods the plots were examined for emergence of crabgrass. Observations substantiated the previously suggested reason for the lack of crabgrass in the plots, since after thinning there was a significant number of crabgrass plants in several of the plots. Because the plots had to be thinned, an artificial condition was created and only qualitative judgment could be made concerning the performance of the test compound. In some instances the rotary tiller dug too deeply into the turf, thus exposing untreated soil in which crabgrass could be established; therefore, a judgment had to be made whether the crabgrass plants were grown in a deep hole, an untreated soil, or in the shallow rims.

Plots treated with 1-ethyl-2', 4'6'-triisopropylbenzyl alcohol 14 days after laying the sod were judged to have less crabgrass than the untreated seeded control plots. Of these, plots treated with 1-ethyl-2', 4', 6'-triisopropylbenzyl alcohol at 5 pounds per acre and 2 pounds per acre had some crabgrass plants only on the bottom of deep holes cut by the rotary tiller. The plots sprayed with 1-ethyl-2', 4', 6'-triisopropylbenzyl alcohol 58 days after the sod was laid were free of crabgrass at both the 2 pounds per acre and 5 pounds per acre rates.

The 1-ethyl-2', 4', 6'-triisopropylbenzyl alcohol used in these experiments was dissolved in a solvent mixture (90% acetone, 8% methanol, and 2% dimethylformamide by volume) and sprayed on the plots in 140 milliliters of solvent, each 40-square-feet area receiving 0.415 grams/pound/acre of 1-ethyl-2', 4', 6'-triisopropylbenzyl alcohol.

Tests have been conducted to compare the response of johnsongrass, crabgrass and other plant species to pre-emergent applications of the following:
1. 1-ethyl-2', 4', 6'-triisopropylbenzyl alcohol,
2. Benzyl alcohol,
3. 1-methyl-4'-isopropyl benzyl alcohol and
4. 3,4-dichloro-2-trichloromethylbenzyl alcohol The results of ratings after 2 weeks are presented below in Table 17. As before 0 indicates no injury or control, and 10 indicates a complete kill.

Table 17

| Compound | Rate, pounds per acre | CBGS | ANBG | KTBG | BNGS | RICE | JNGS |
|---|---|---|---|---|---|---|---|
| (1) | 1 | 9 | 0 | 10 | 2 | 0 | 3 |
|  | 2 | 10 | 4 | 9 | 3 | 0 | 8 |
|  | 4 | 10 | 8 | 10 | 6 | 1 | 9 |
|  | 10 | 10 | 8 | 10 | 9 | 2 | 9 |
| (2) | 1 | 0 | 3 | 4 | 0 | 0 | 0 |
|  | 2 | 0 | 3 | 8* | 0 | 0 | 0 |
|  | 4 | 0 | 0 | 2 | 0 | 0 | 0 |
|  | 10 | 0 | 0 | 2 | 0 | 0 | 0 |
| (3) | 1 | 0 | 0 | 0 | 0 | 0 | 0 |
|  | 2 | 0 | 0 | 2 | 0 | 0 | 0 |
|  | 4 | 0 | 2 | 3 | 0 | 0 | 0 |
|  | 10 | 0 | 0 | 1 | 0 | 0 | 0 |
| (4) | 1 | 0 | 0 | 1 | 0 | 0 | 0 |
|  | 2 | 1 | 1 | 1 | 0 | 0 | 3 |
|  | 4 | 2 | 2 | 3 | 2 | 1 | 4 |
|  | 10 | 5 | 4 | 7 | 3 | 2 | 5 |

*Rating anomolous-poor germination.

From the foregoing, the superiority of compound 1 to other compounds mentioned in the prior art is apparent, particularly with reference to the control of crabgrass.

The especial effectiveness of compound (1), 1-ethyl-2', 4', 6'-triisopropylbenzyl alcohol, as compared with other compounds of similar chemical structure, can be seen from the following Table 18, which summarizes data presented above in the places indicated. In this Table, compound (1) is compared with the following: (5) 1-methyl-2', 4', 6'-triisopropylbenzyl alcohol, (6) 1-n-propyl-2', 4', 6'-triisopropylbenzyl alcohol, and (7) 1, 2'4', 6'-tetraisopropylbenzyl alcohol.

Table 18

| Compound | Rate of Application, Pounds Per Acre | JNGS | YLFX | BNGS | CBGS |
|---|---|---|---|---|---|
| 1 | 10 | $6^2$ | $9^2$ | $9^2$ | $10^2$ |
|  | 5 | $9^1$ | $9^1$ | $9^1$ | $10^1$ |
|  | 2 | $8^1$ | $8^1$ | $8^1$ | $10^1$ |
|  | 1 | $8^1$ | $8^1$ | $5^1$ | $9^1$ |
| 5 | 10 | $3^3$ | $7^3$ | $6^3$ | $10^3$ |
|  | 5 | $4^4$ | $7^4$ | $7^4$ | $9^4$ |
|  | 2 | $0^4$ | $3^4$ | $5^4$ | $3^4$ |
|  | 1 | $0^4$ | $3^4$ | $2^4$ | $3^4$ |
| 6 | 10 | $2^7$ | $9^7$ | $4^7$ | $9^7$ |
|  | 5 | $0^5$ | $9^5$ | $5^5$ | $9^5$ |
|  | 2 | $0^5$ | $5^5$ | $2^5$ | $8^5$ |
|  | 1 | $0^5$ | $0^5$ | $0^5$ | $5^5$ |
| 7 | 10 | $0^8$ | $9^8$ | $7^8$ | $10^8$ |
|  | 5 | $0^6$ | $6^6$ | $3^6$ | $9^6$ |
|  | 2 | $0^6$ | $4^6$ | $1^6$ | $7^6$ |
|  | 1 | $0^6$ | $1^6$ | $0^6$ | $2^6$ |

[1] See ratings, 20 days, Table 3
[2] See ratings, 20 days, Table 2
[3] See ratings, 23 days, Table 5
[4] See ratings, 13 days, Table 10
[5] See ratings, 20 days, Table 12
[6] See ratings, 13 days, Table 11
[7] See ratings, 23 days, Table 7
[8] See ratings, 23 days, Table 6

The foregoing Table 18 shows an especially better herbicidal effect for the compound (1) especially at low rates of application on the order of 1 or 2 pounds per acre. At rates that low, compound (1) consistently outperforms compounds 5, 6, and 7, which are (chemically speaking) adjacent homologs.

While I have shown and described herein certain embodiments of my invention, I intend to cover as well any change or modification therein that may be made without departing from its spirit and scope.

I claim:

1. A method for controlling annual grasses comprising applying in pre-emergent mode to soil containing annual grass seeds a compound represented by the structural formula

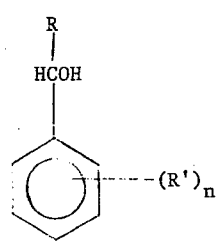

wherein:
R is hydrogen or alkyl containing from 1 to 4 carbon atoms;
each R' is independently an alkyl containing from 1 to 6 carbon atoms; and
$n$ is 2, 3, or 4;
in an amount effective to preclude the establishment from such seeds of annual grass in said soil.

2. The method of claim 1 wherein R is hydrogen or alkyl containing from 1 to 3 carbon atoms and each R' is independently an alkyl containing from 1 to 3 carbon atoms.

3. A method for controlling crabgrass comprising applying to soil seeded with crabgrass an amount of a compound represented by the structural formula

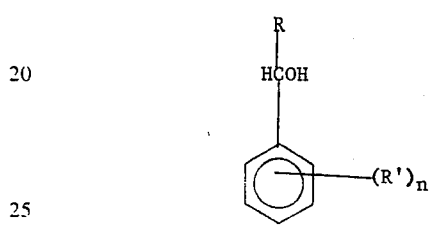

wherein:
R is hydrogen or alkyl containing from 1 to 4 carbon atoms;
each R' is independently an alkyl containing from 1 to 6 carbon atoms; and
$n$ is 2, 3, or 4;
effective to preclude the establishment from such seed of crabgrass in said soil.

4. The method of claim 3 wherein each R' is isopropyl.

5. The method of claim 4 wherein $n$ is 3.

6. The method of claim 5 wherein the isopropyl groups are located in the 2', 4', 6'-positions.

7. The method of claim 3 wherein said compound is 2', 4', 6'-triisopropylbenzyl alcohol.

8. The method of claim 3 wherein said compound is 1-methyl-2', 4', 6'-triisopropylbenzyl alcohol.

9. The method of claim 3 wherein said compound is 1-ethyl-2', 4', 6'-triisopropylbenzyl alcohol.

10. The method of claim 3 wherein said compound is 1-propyl-2', 4', 6'-triisopropylbenzyl alcohol.

11. The method of claim 3 wherein said compound is 1, 2', 4', 6'-tetraisopropylbenzyl alcohol.

12. The method of claim 3 wherein said compound is 1-methyl-2', 6'-dimethyl-4'-tert-butylbenzyl alcohol.

13. The method of claim 3 wherein said compound is 1, 2', 4', 6'-tetraethylbenzyl alcohol.

14. The method of claim 3 wherein said compound is 1-ethyl-2', 4', 5'-triisopropylbenzyl alcohol.

15. The method of claim 3 wherein said compound is 1-ethyl-2', 4'-diisopropylbenzyl alcohol.

16. The method of claim 3 wherein said crabgrass control is effected in established bluegrass turf.

* * * * *